Patented Sept. 26, 1933

1,928,260

UNITED STATES PATENT OFFICE 1,928,260

METHOD FOR THE CURING OF PYROXYLIN PLASTIC MATERIAL

George H. Murray, Nixon, N. J., assignor to Nixon Nitration Works, Nixon, N. J., a corporation of New Jersey No Drawing. Application February 4, 1931
Serial No. 513,463

1 Claim. (Cl. 18—51)

The present invention relates to an improved method for the curing of pyroxylin plastic material, and has for an object to save a considerable amount of time and expense in curing of pyroxylin plastics over the method as at present practiced.

In the trade, this matter of curing pyroxylin is called plastic seasoning, and it is the accepted practice to season pyroxylin plastics in an atmosphere of air at temperatures ranging from 90° to 130° F. The length of time depends on the seasoning temperature and the thickness of the pyroxylin material, which is in usually sheet, rod or other like form. For instance, a sheet of 10/1000" thick is seasoned for seven days at a temperature of 115° F.; a sheet 50/1000" thick in ten days at the same temperature; a sheet 100/1000" thick in nineteen days; a sheet 200/1000" thick in thirty-four days; and a sheet 300/1000" thick in forty-six days.

Very delicate colors are seasoned at a low temperature, a low temperature for this work being approximately 90° F. For other colors, which are more stable, the seasoning temperature may be as high as 130° F. The intermediate range of degrees of temperature is used, depending upon the fugitiveness of the colors.

I have discovered that when these pyroxylin sheets are immersed in water before seasoning for approximately one quarter of the present seasoning time, then dried for approximately one quarter of the regular seasoning time in an atmosphere of air according to the present method of drying, the residual solvent is reduced to the same per cent as the present orthodox or standard method. In other words, by use of the preliminary water bath, I am enabled to save approximately one-half of the seasoning time of pyroxylin materials. The water temperature of the preliminary bath will also preferably range from 90° to 130° F. in accordance with the control and regulation of this temperature range in the present procedure, as above pointed out, the temperature being varied for delicate or stable colors and for the time and thickness of the sheets, etc.

The improved method has been found to save one-half of the time of seasoning, eliminating fifty per cent of the fire hazard and enabling factories to deliver goods to the customers in approximately one-half of the time.

As an alternative to immersing the pyroxylin material in water, I have found that approximately the same result can be accomplished by initially placing the pyroxylin sheets, rods, etc. in a vault, room, tank, box or any receptacle which will retain humidity. Any desired humidifying apparatus, such as spraying device, steam jet, etc. is placed in the room or receptacle, and the humidity of the room maintained by such apparatus in excess of eighty per cent, which will impart substantially as much moisture contact to the plastic pyroxylin as in the case of the water bath. The temperature of this humid room will be maintained at the ordinary seasoning range of temperature, that is, from 90° to 130° F.

It will thus be seen that my improved method involves a simple operation of immersing pyroxylin plastics in water or in an atmosphere filled with water before proceeding with the regular method of seasoning, and by doing this, I save substantially one-half the time of seasoning with numerous other accompanying savings in labor, time, fire hazard, investments, etc.

I claim:

That method of reducing the length of time required in curing pyroxylin plastic material, which consists in first subjecting the pyroxylin plastic material to water at a temperature of about 90° to 130° F. according to the stable qualities of colors in the material and the thickness of the material for a period approximating one quarter of the present seasoning time, then drying the wet plastic material for approximately a second quarter of the regular seasoning time in an atmosphere of air at from 90° to 130° F. proportionately to the stable qualities of the colors in the plastic material and the thickness of the latter.

GEORGE H. MURRAY.